(12) United States Patent
Miyamae et al.

(10) Patent No.: US 8,211,562 B2
(45) Date of Patent: Jul. 3, 2012

(54) BATTERY PACK PROVIDED WITH OUTER CASING

(75) Inventors: Ichiro Miyamae, Hyogo (JP); Yoshiaki Nishijima, Hyogo (JP); Tomotsugu Ogawa, Hyogo (JP)

(73) Assignee: Sanyo Electric Co., Ltd., Osaka (JP)

( * ) Notice: Subject to any disclaimer, the term of this patent is extended or adjusted under 35 U.S.C. 154(b) by 515 days.

(21) Appl. No.: 12/403,487

(22) Filed: Mar. 13, 2009

(65) Prior Publication Data

US 2009/0233161 A1    Sep. 17, 2009

(30) Foreign Application Priority Data

Mar. 13, 2008    (JP) .................................. 2008-64859

(51) Int. Cl.
*H01M 2/10* (2006.01)
(52) U.S. Cl. ........................................................ 429/96
(58) Field of Classification Search ........................ None
See application file for complete search history.

(56) References Cited

FOREIGN PATENT DOCUMENTS

JP    2004327206 A  * 11/2004

OTHER PUBLICATIONS

Machine Translation of the above cited JP2004327206, obtained from the website of the Japanese Patent Office on Aug. 16, 2011.*

* cited by examiner

*Primary Examiner* — Patrick Ryan
*Assistant Examiner* — Wyatt McConnell
(74) *Attorney, Agent, or Firm* — Wendroth, Lind & Ponack, L.L.P.

(57) ABSTRACT

A battery pack includes: a plastic-made, elongated outer casing composed of interconnected peripheral walls to define an interior battery storage portion; and a battery accommodated in the battery storage portion inside the outer casing. The outer casing has a mounting protrusion to be attached to and project outwardly from an electronic equipment casing. An inner casing is incorporated inside the outer casing of the battery pack. The battery pack is constructed and arranged so that an outer battery, located outside the electronic equipment, is accommodated inside the inner casing.

17 Claims, 17 Drawing Sheets

BATTERY PACK PROVIDED WITH OUTER CASING

BACKGROUND OF THE INVENTION

1. Field of the Invention

The present invention relates to a battery pack accommodating a battery in a plastic-made outer casing, and particularly pertains to a battery pack to be attached to and projecting from electronic equipment such as a laptop-type personal computer to improve an anti-shock strength of a protruded portion.

2. Description of the Related Art

When a battery pack attachable to a laptop-type personal computer is attached so that the battery pack projects from the personal computer, a discharging capacity can be enlarged. When the battery pack is dropped in a state of being attached to the personal computer, such battery pack is subjected to a very strong shock. Such strong shock will deform the outer casing, and the deformed outer casing will cause damage to the battery. Thus, it is important to improve an anti-shock strength of the battery pack which is used for such an application. The present applicant has developed a battery pack intended to improve the anti-shock strength. Such battery pack is disclosed in JP 2004-327206-A.

FIG. 1 shows the battery pack disclosed in JP 2004-327206-A. The battery pack includes a casing 91 and a hollow cover 92, the casing 91 being composed of a first casing 91A and a second casing 91B. The first casing 91A, the second casing 91B, and the hollow cover 92 are respectively made of a plastic material. The first casing 91A has a battery storage portion 94 for accommodating a battery 93. The first casing 91A has a battery cover wall 95 in a position opposite to an end face of the battery 93 accommodated in the battery storage portion 94. The second casing 91B is longer in overall length than the first casing 91A, and has a protrusion 97 that projects outwardly from the battery cover wall 95 of the first casing 91A. The second casing 91B has a projecting end face wall 98 at a tip face of the protrusion 97. The hollow cover 92 is fixed between the projecting end face wall 98 of the second casing 91B and the battery cover wall 95 of the first casing 91A. The hollow cover 92 is formed in a hollow state of sealing an opening of a gap defined between the projecting end face wall 98 and the battery cover wall 95.

The battery pack is structured so that the hollow cover is fixed to the protrusion projecting outwardly from the battery storage portion and a hollow portion is defined by the protrusion and the hollow cover so that the shock is absorbed by the hollow portion. Since such structure ensures that when subjected to a large shock, the portion that absorbs the shock is not crushed and a strong shock like when dropped can be effectively absorbed, thus improving the strength resistance. Further, since such a battery pack enables the shock to be absorbed by the hollow portion defined outside the battery storage portion, the battery and other portions can be effectively protected without any damage to the inside battery storage portion even if the protrusion or the hollow cover of the second casing is damaged by a strong shock.

SUMMARY OF THE INVENTION

However, since the battery pack disclosed in JP 2004-327206-A has the hollow portion at opposite ends, such battery pack suffers the disadvantage that the outer casing becomes longer in relation to the overall length of the battery. This constitutes the disadvantage that the overall length of the battery pack becomes larger in order to improve the anti-shock strength. The present invention has been made with a view of remedying this drawback. It is the primary objective of the present invention to provide a battery pack in which the anti-shock strength can be improved while the overall length of an outer casing is made as short as possible.

In order to achieve the above-mentioned objective, the battery pack of the present invention is structured in the following configuration.

The battery pack includes: a plastic-made, elongated outer casing 1 composed of interconnected peripheral walls 11, 12 to define a battery storage portion 4 inside; and a battery 3 accommodated in the battery storage portion 4 inside the outer casing 1.

The outer casing 1 has a mounting protrusion 5 to be attached to and project outwardly from electronic equipment casing 51 and incorporates an inner casing 2 inside the outer casing 1 located at the mounting protrusion 5.

The battery pack is so constructed and arranged that an outer battery 3X located outside electronic equipment 50 is accommodated inside the inner casing 2.

The above-described battery pack is distinctive in that while an overall length of the outer casing is made as short as possible, the anti-shock strength can be improved.

This is because the above-mentioned battery pack is so constructed and arranged that the battery is accommodated in the elongated outer casing defining the battery storage portion inside the interconnected peripheral walls, that the outer casing has the mounting protrusion to be attached to and project outwardly from the electronic equipment casing, and that the inner casing is incorporated inside (a portion of) the outer casing located at the mounting protrusion so as to accommodate the outer battery located outside the electronic equipment in the inner casing.

In such a structure, since the mounting protrusion to be attached to and project outwardly from the electronic equipment is of a double structure composed of the outer casing and the inner casing to accommodate the outer battery inside the double structure, the anti-shock strength of the mounting protrusion can be improved, with the overall length of the outer casing being made shorter.

In the above-described battery pack, when an anti-shock rib is integrally formed at an end of the inner casing so as to receive a shock acting on the end of the inner casing, the anti-shock strength of the mounting protrusion can further be improved.

In the above-described battery pack, when the anti-shock rib of the inner casing is connected to the outer casing, the shock acting on the outer casing can be received by the outer casing via the anti-shock rib of the inner casing, and thus any harm to the mounting protrusion of the outer casing can be effectively inhibited both by the outer casing and by the anti-shock rib of the inner casing.

In the above-described battery pack, the outer casing is provided with a slanted surface at a protrusion corner of the mounting protrution. The inner casing has a side wall located inside the slanted surface, and the side wall is integrally formed with a plurality of rows of the anti-shock ribs extending inwardly from the side wall. When the battery pack falls to the ground together with the electronic equipment, the shock given to the protrusion corner of the mounting protrusion is received by the plurality of rows of the anti-shock ribs, and thus the protrusion corner can be so structured as to be very strong for improving the anti-shock strength of such portion to a considerable extent.

Particularly, in a situation where a strong shock acts on the protrusion corner when the electronic equipment falls in a posture with the protrusion corner facing downwardly, the anti-shock strength of the protrusion corner can be remarkably improved.

In the above-described battery pack, the inner casing has the plurality of parallel rows of the anti-shock ribs near an end face of the incorporated battery, and so when the battery pack falls together with the electronic equipment, the shock applied to the mounting protrusion can be received by the plurality of rows of the anti-shock ribs to improve the anti-shock strength of the mounting protrusion.

In the above-described battery pack, a planar rib and a plurality of rows of the connection ribs can be integrally formed with the inner casing at a portion where the plurality of rows of the anti-shock ribs are connected with the outer casing. The planar rib is connected in a direction orthogonal to the plurality of rows of the anti-shock ribs and the plurality of rows of the connection ribs are disposed with respect to the outer casing in a connection orthogonal to the planar rib. In the battery pack thus structured, when the battery pack falls with the mounting protrusion facing downwardly, the shock acting on the mounting protrusion is received by the anti-shock ribs, and the shock absorbed by the anti-shock ribs is dispersed by the planar rib. Also, when such dispersed shock is propagated to the outer casing by means of the connection ribs, the strong shock acting locally on the mounting protrusion is dispersed and received by the anti-shock ribs, the planar rib, the connection rib and the outer casing. Thus, the anti-shock strength of the mounting protrusion is remarkably improved.

The above-described battery pack is so constructed and arranged that the inner casing has the plurality of parallel rows of the anti-shock ribs near the end face of the incorporated outer battery and further that the plurality of rows of the anti-shock ribs are connected to the outer casing such that when the battery pack to be attached to and projecting from the electronic equipment falls together with the electronic equipment, the shock applied to the mounting protrusion can be received by the plurality of rows of the anti-shock ribs and the outer casing, and thus the anti-shock strength of the mounting protrusion can be improved.

The above and further objects of the present invention as well as the features thereof will become more apparent from the following detailed description in conjunction with the accompanying drawings.

DETAILED DESCRIPTION OF THE EMBODIMENT(S)

Figure 1:
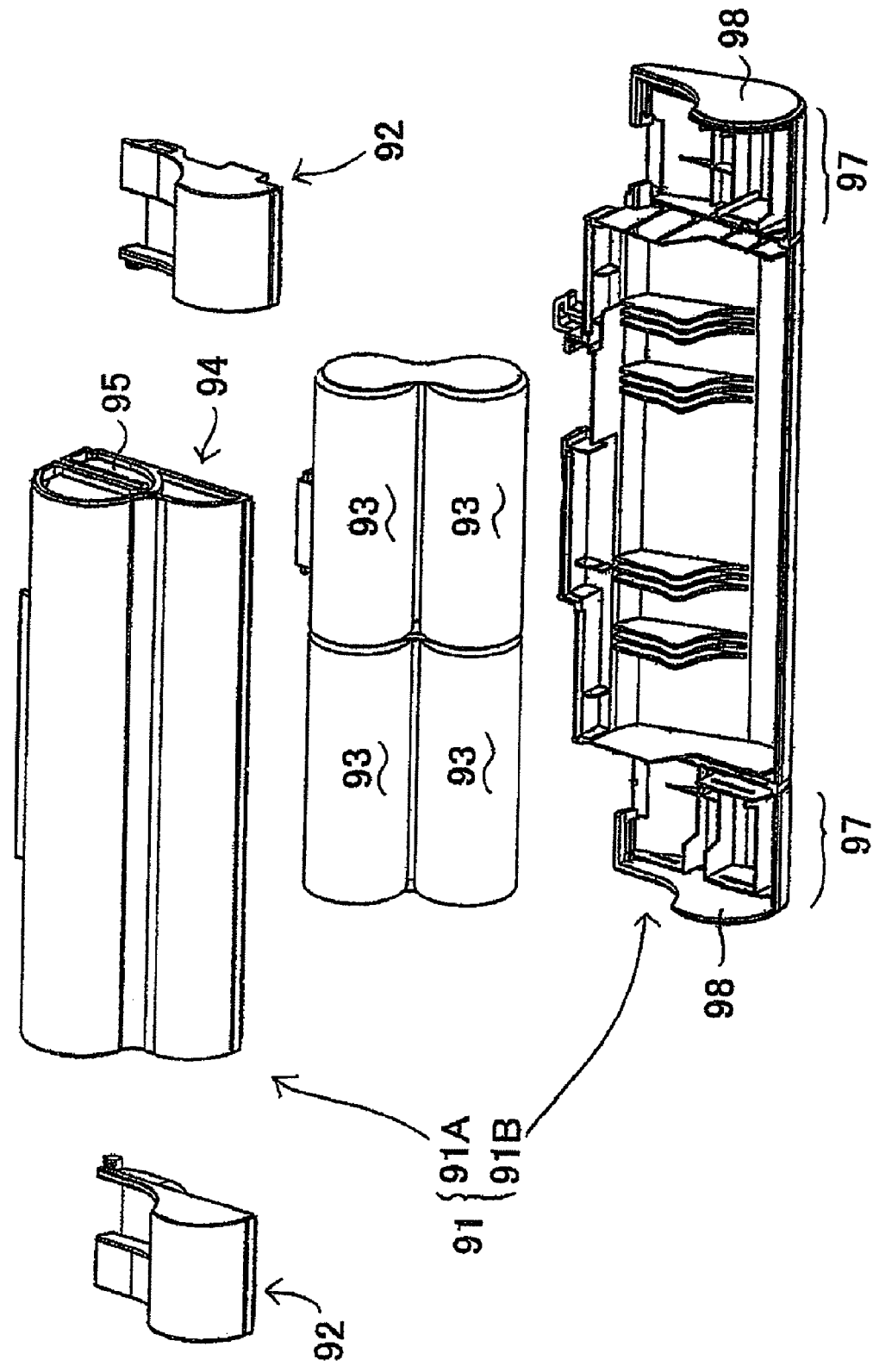
FIG. 1 is an exploded perspective view showing a conventional type of battery pack.
Figure 2:
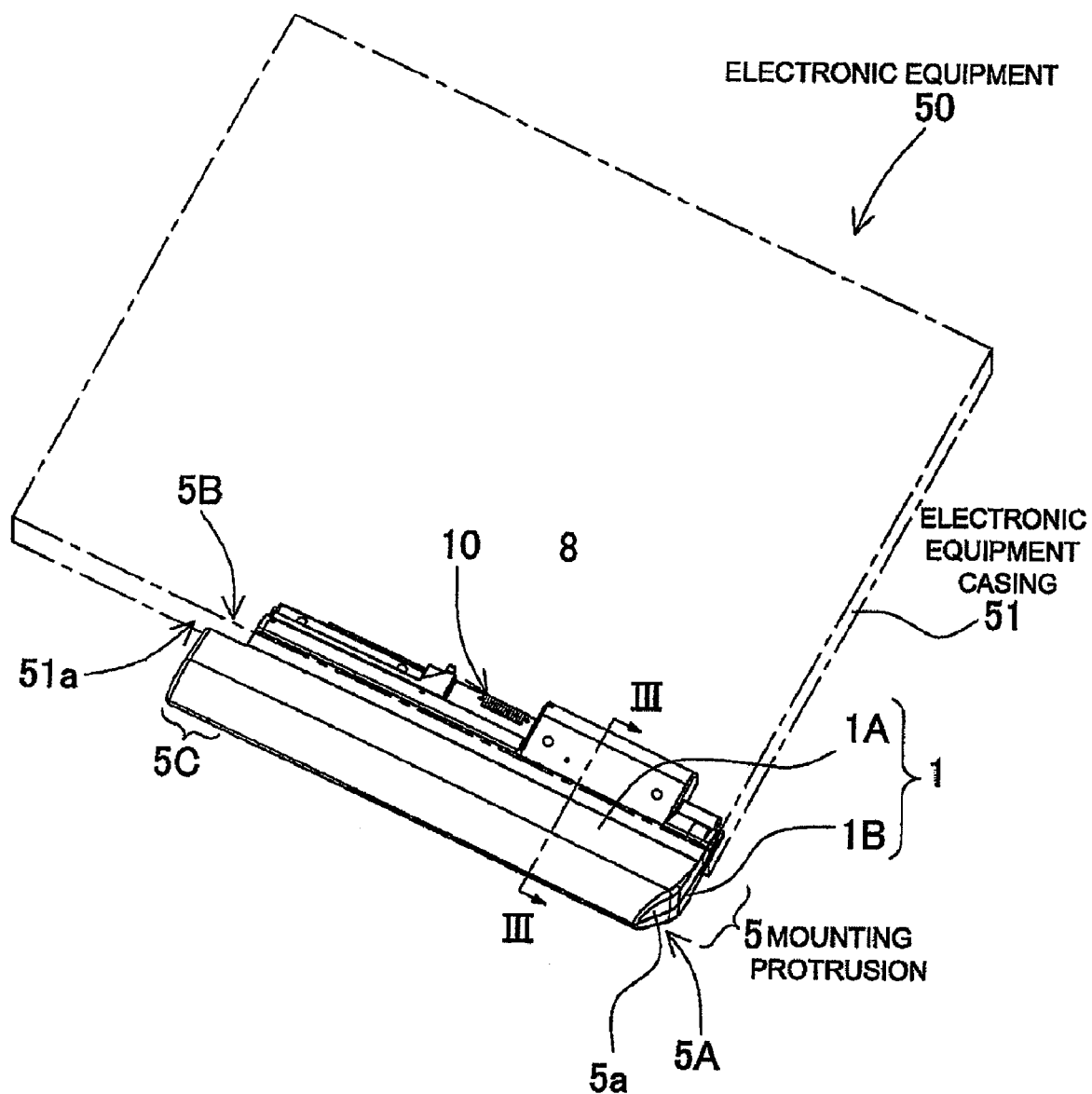
FIG. 2 is a schematic perspective view showing how the battery pack is used in accordance with a first embodiment of the present invention.
Figure 13:
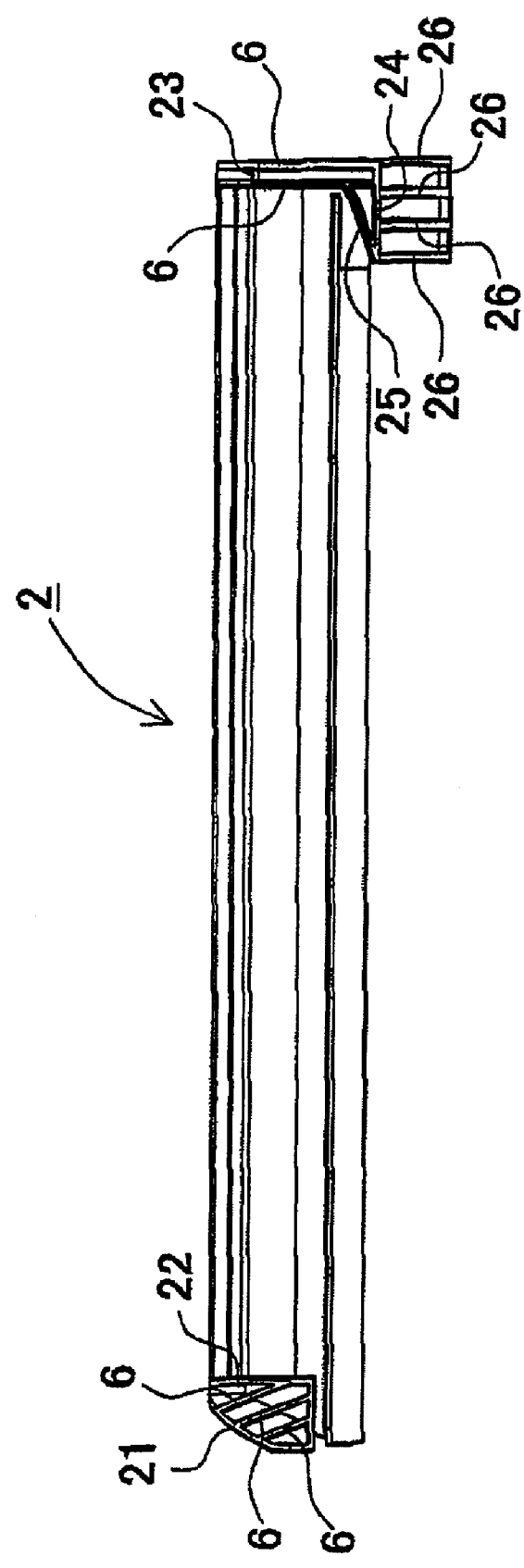
FIG. 13 is a top plan view of the inner casing shown in FIG. 10.
Figure 14:
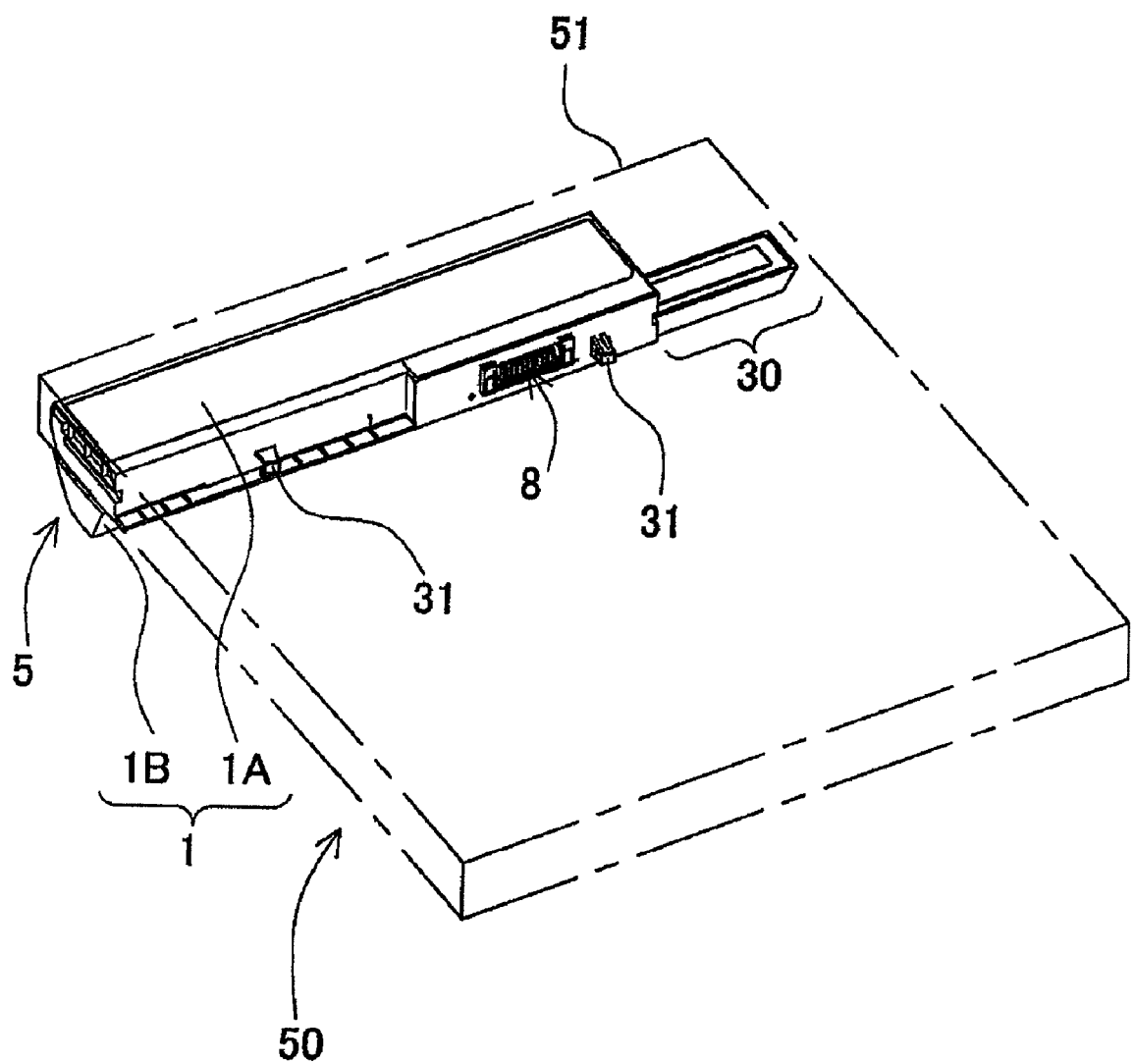
FIG. 14 is a schematic perspective view showing how the battery pack is used in accordance with a second embodiment of the present invention.
Figure 15:
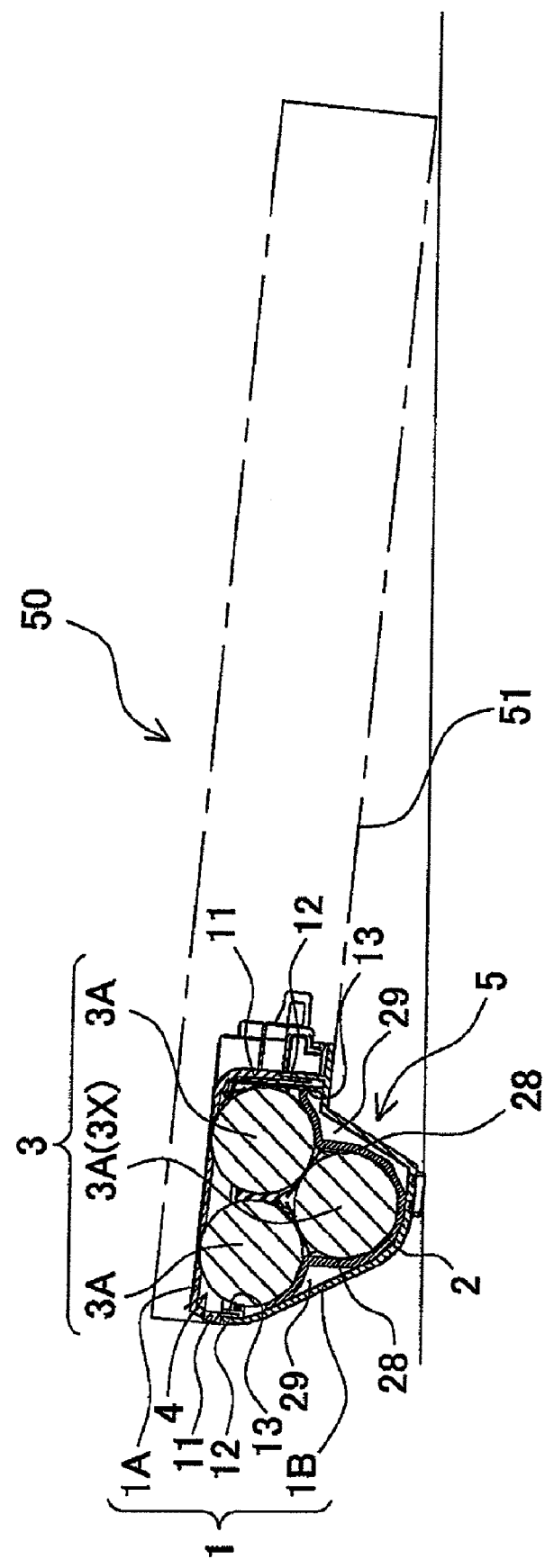
FIG. 15 is a vertical, transverse, sectional view of the battery pack shown in FIG. 14.

A battery pack in accordance with a first embodiment as shown in FIG. 2 through FIG. 13 and a battery pack in accordance with a second embodiment as shown in FIG. 14 through FIG. 18 are releasably attached to electronic equipment such as a laptop-type personal computer. As shown in FIG. 2 and FIG. 15, each of these battery packs is partially provided with a mounting protrusion 5 projecting outwardly from an electronic equipment casing 51 of the electronic equipment 50. In these battery packs, an electric charging capacity is made larger by accommodating a battery 3 in the mounting protrusion 5 as well. However, the present invention is not specifically limited to a laptop-type personal computer as the electronic equipment but can also be used with other kinds of portable electronic equipment such as a printer and PDA.

The battery pack shown in FIG. 2 through FIG. 17 accommodates a plurality of batteries 3 in a plastic-made, elongated outer casing 1. The outer casing 1, being composed of a plastic-made top casing 1A and bottom casing 1B, is fabricated by interconnecting peripheral walls 11, 12 to define an interior battery storage portion 4. Further, the battery pack incorporates an inner casing 2 inside the bottom casing 1B, and the battery 3 is accommodated inside the inner casing 2. The inner casing 2 is formed of a plastic material in a shape that conforms to an inner surface of the bottom casing 1B. The inner casing 2 has an anti-shock rib 6 integrally formed at the end of the inner casing 2.

(Battery)

The battery 3 is composed of a plurality of cells 3a linearly interconnected in series to make up a battery module 3A. A plurality of such battery modules 3A in a parallel posture are accommodated in the battery storage portion 4 of the elongated outer casing 1. In the case of the illustrated battery pack, three cells 3a are linearly interconnected in series to make up the battery module 3A. The cell 3a is a cylindrical lithium-ion cell. It should be noted, however, that the cell can be any kind of rechargeable cell, such as a nickel-hydrogen cell and a nickel-cadmium cell, instead of the lithium-ion cell. In the case of the illustrated battery 3, although three cells 3a are linearly interconnected in series to make up the battery module 3A, it is also practical and practicable that two cells or four or more cells are linearly interconnected in series to make up a battery module for being accommodated in the outer casing. To describe the illustrated battery pack further, three battery modules 3A are interconnected in parallel to be accommodated in the outer casing 1. The three battery modules 3A are connected by spot-welding a lead 9 to terminal electrodes at opposite ends and are mutually connected in parallel by means of the lead.

Connected to the battery 3 are a circuit board 7 and a connector 8. Mounted on the circuit board 7 is a protection circuit to protect the battery 3. The protection circuit detects a voltage and a residual capacity of the battery 3, controls a charging current and a discharging current to protect the battery 3 from being overcharged and over-discharged, and interrupts a current flow when an overcurrent is detected. The connector 8, which is connected to the battery 3 and the circuit board 7, is disposed at a contact window 10 of the outer casing 1. The connector 8, being set for the electronic equipment 50 such as a personal computer, is connected to a connector (not shown) of the electronic equipment 50.

A detailed description shall be made below regarding the outer casing and the inner casing of the battery pack in accordance with the first embodiment.

(Outer Casing)

Figure 3:
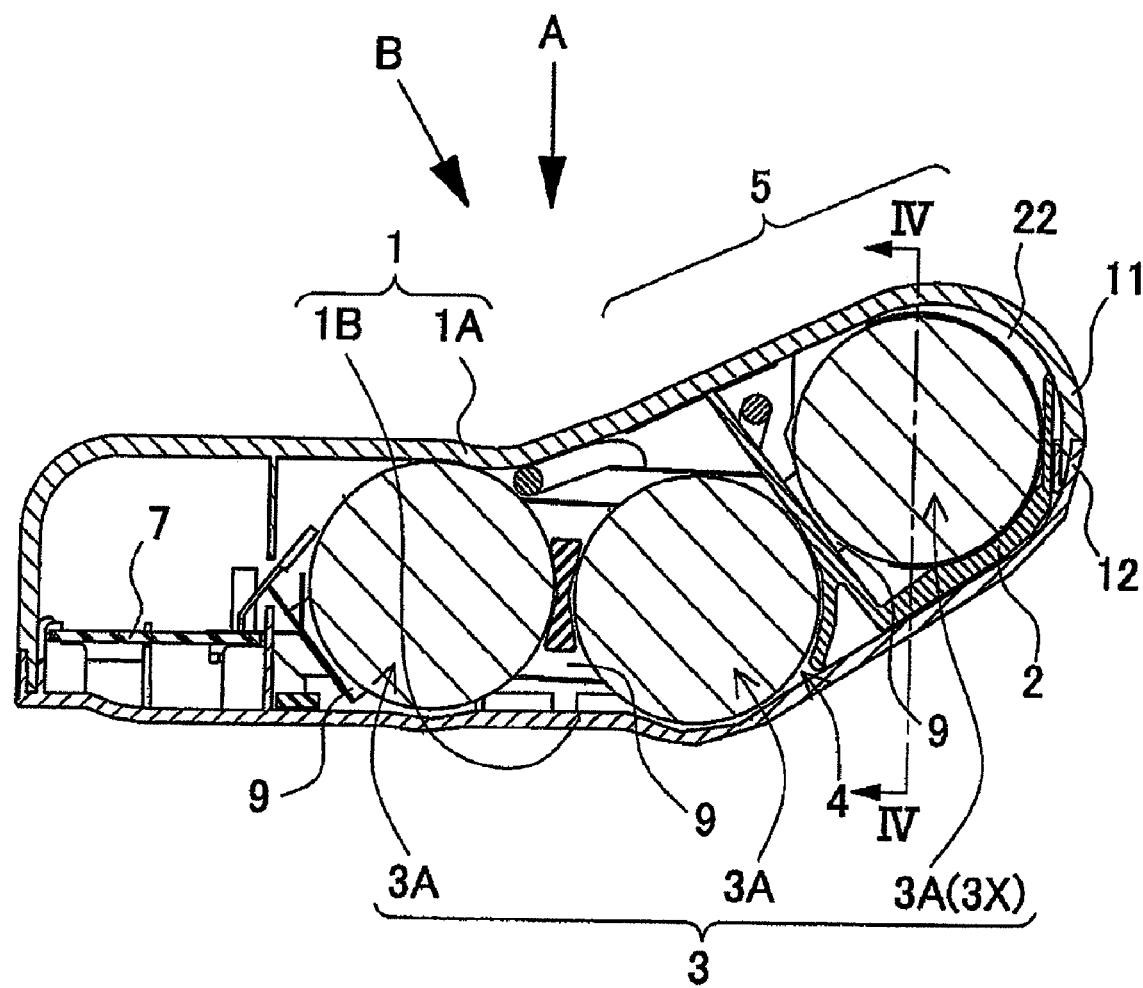
FIG. 3 is a sectional view taken along line III-III in the battery pack shown in FIG. 2.
Figure 4:
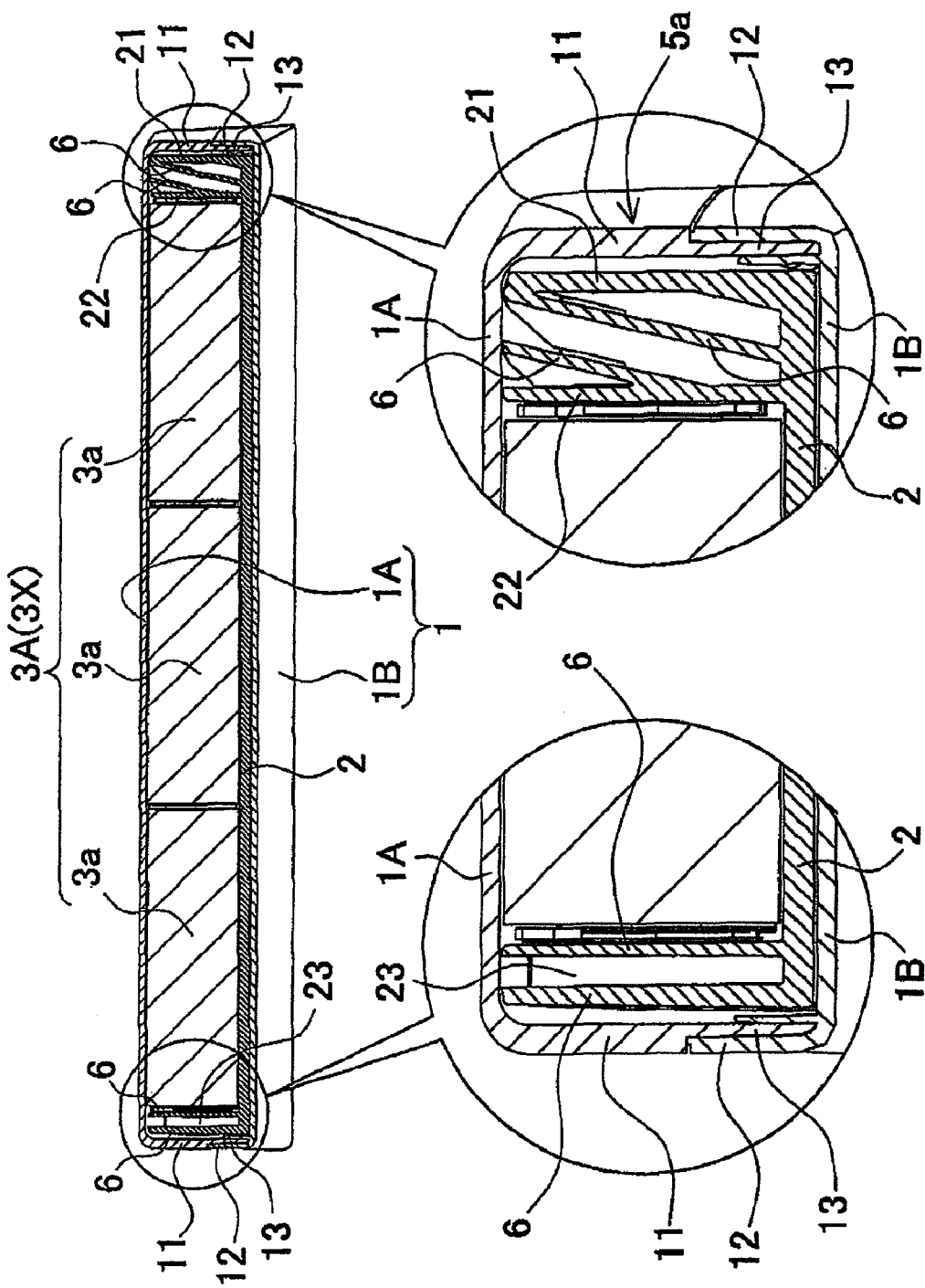
FIG. 4 is a sectional view taken along line IV-IV in the battery pack shown in FIG. 3.
Figure 5:
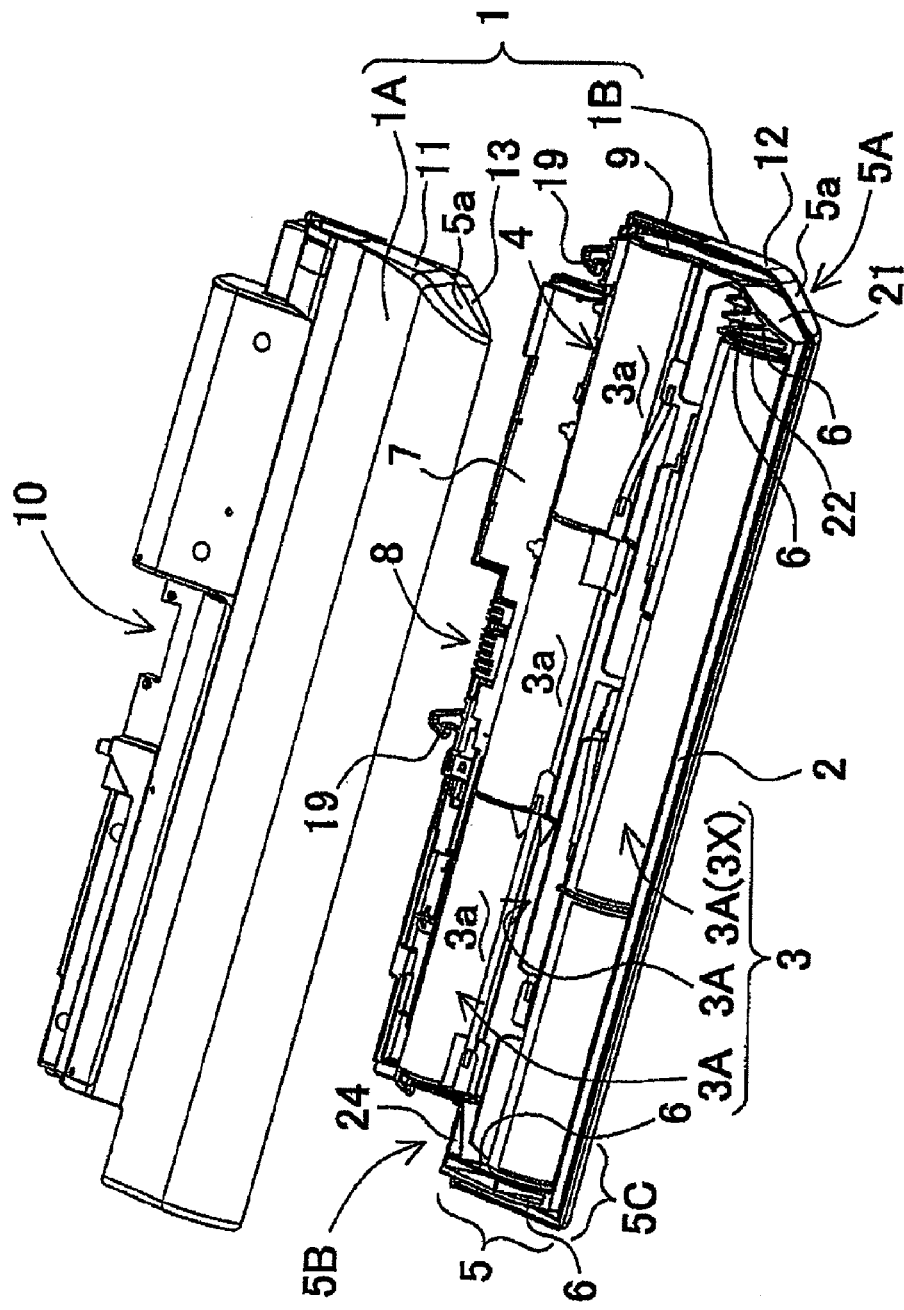
FIG. 5 is an exploded perspective view of the battery pack shown in FIG. 2.
Figure 6:
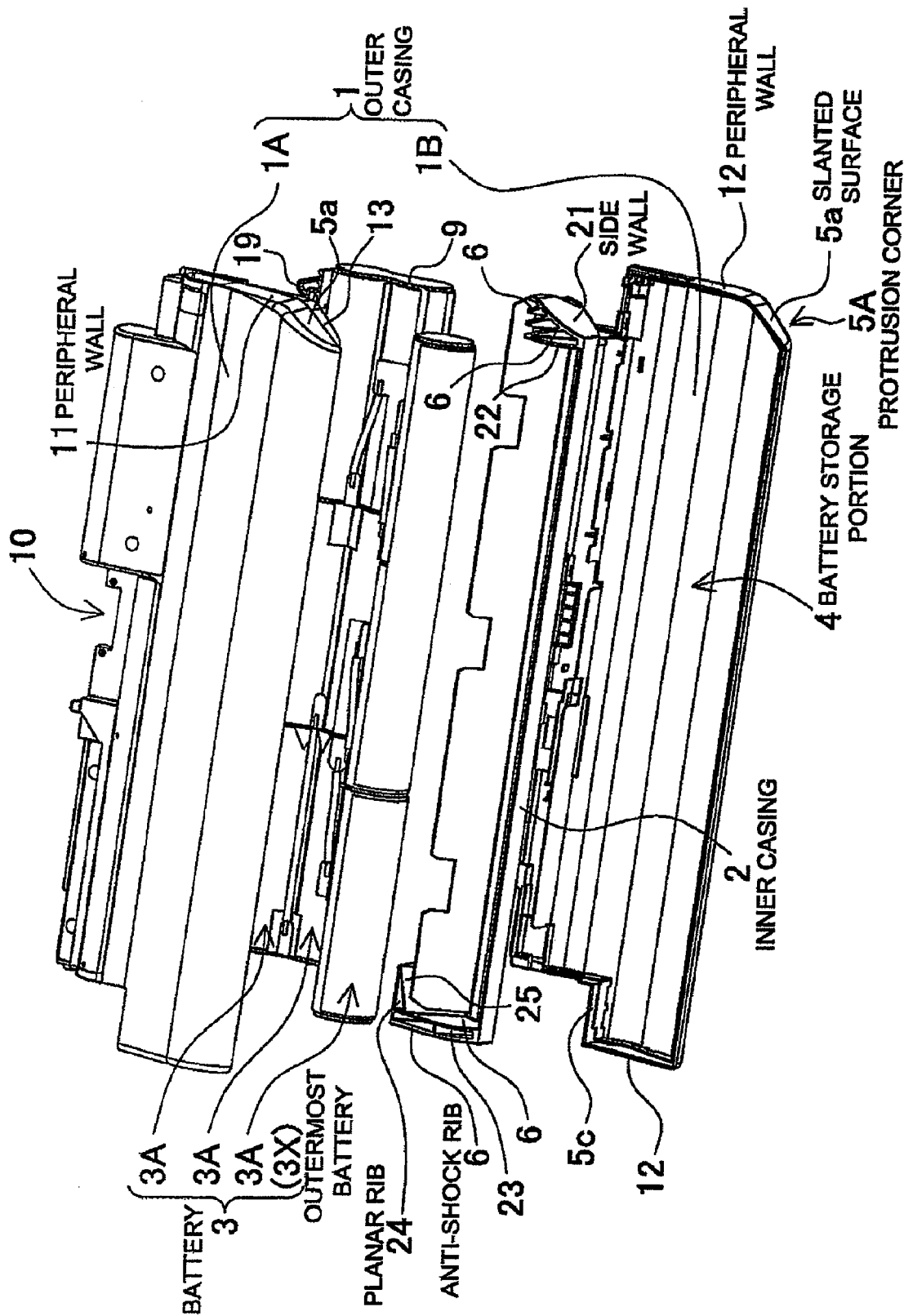
FIG. 6 is an exploded perspective view of the battery pack shown in FIG. 5.
Figure 7:
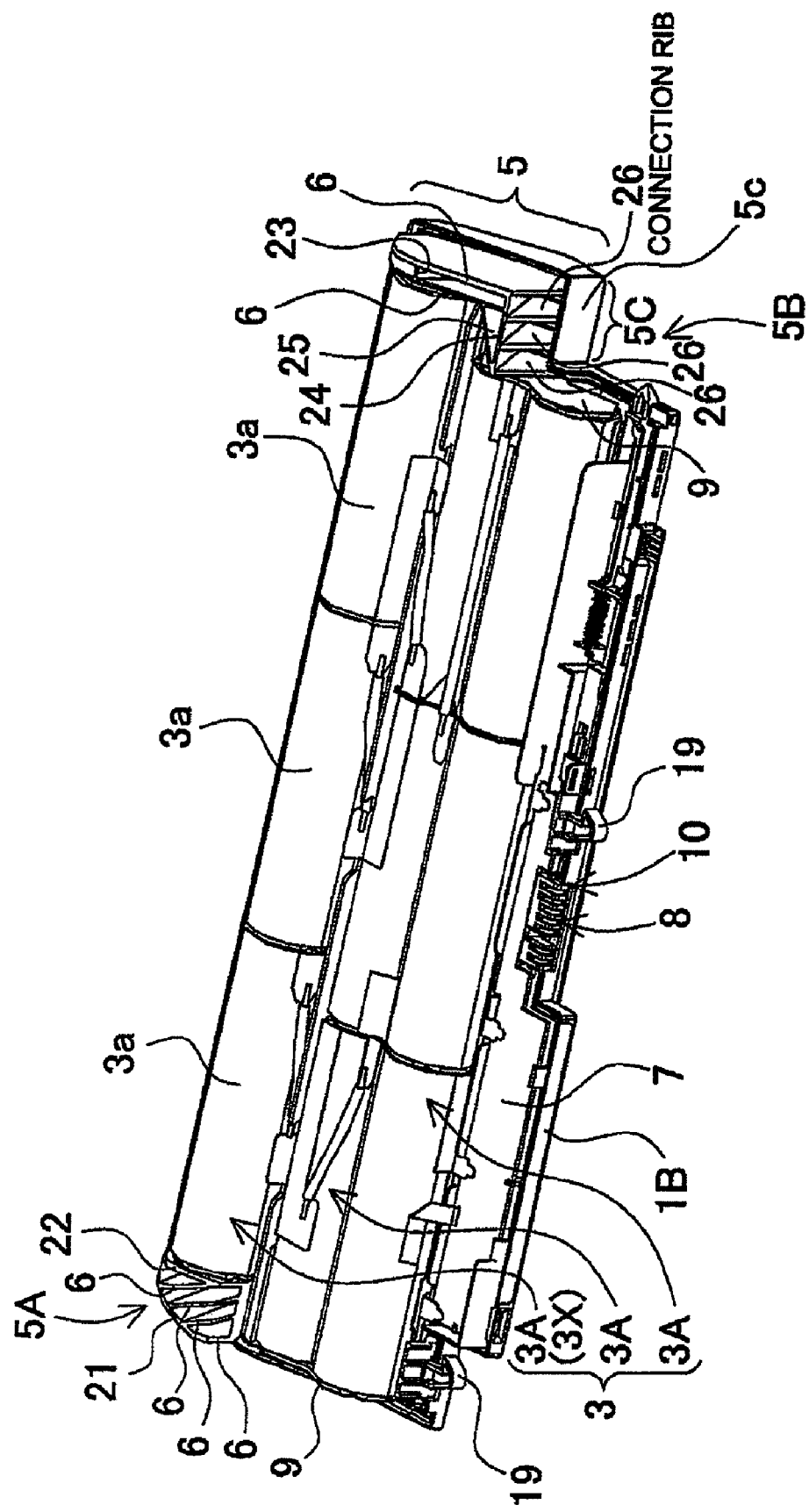
FIG. 7 is a rear perspective view of the battery pack shown in FIG. 5, with the top casing being removed.
Figure 8:
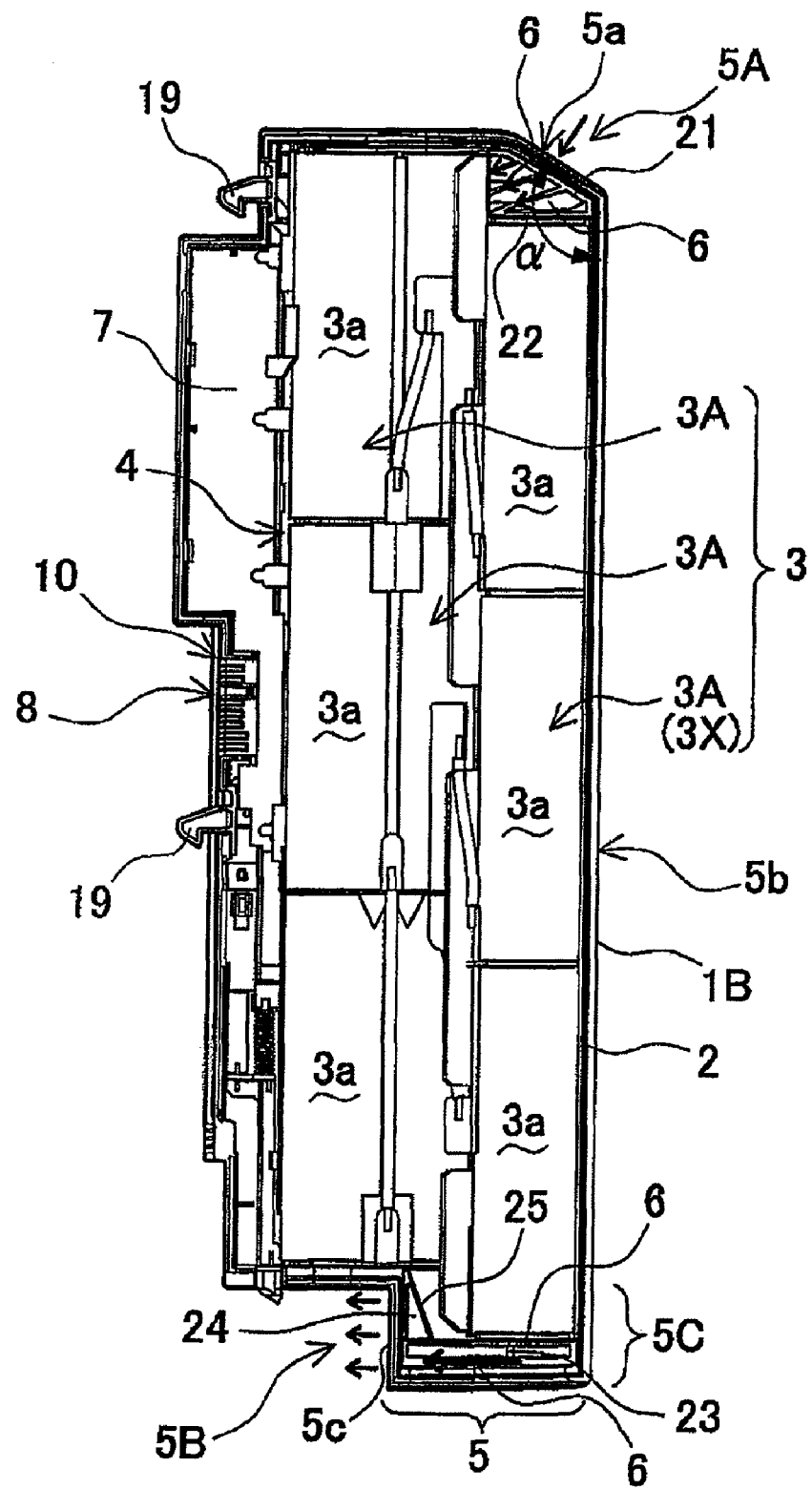
FIG. 8 is a top plan view of the battery pack shown in FIG. 3, with the top casing being removed, as viewed from the direction indicated by arrow A.
Figure 9:
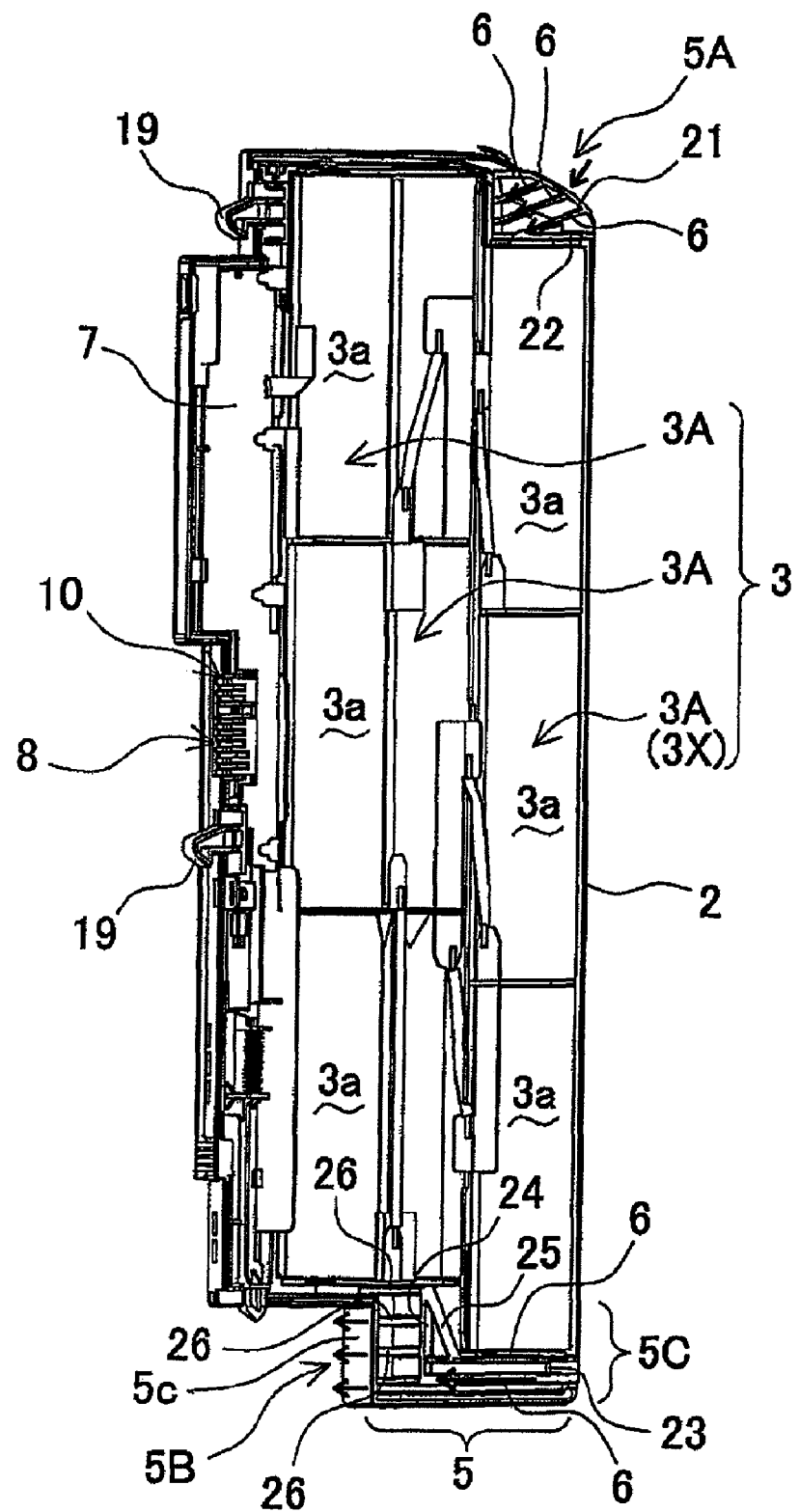
FIG. 9 is a top plan view of the battery pack shown in FIG. 3, with the top casing being removed, as viewed from the direction indicated by arrow B.

The outer casing 1 of the battery pack shown in FIG. 2 through FIG. 11 is composed of the bottom casing 1B on the lower side and the top casing 1A on the upper side. The outer casing 1 has a connection hook 19 on the connection side where the battery pack is attached to the electronic equipment 50, and the mounting protrusion 5 to be attached to and project from the electronic equipment 50 is provided on a side opposite to the connection side, namely, at the left front side as viewed in FIG. 2 (on the right rear end as viewed in FIG. 3). In FIG. 2 and FIG. 5 or FIG. 9, a slanted surface 5a is formed at a protrusion corner 5A located at a first end of the mounting protrusion 5 of the outer casing 1. As shown in FIG. 8, the slanted surface 5a is set obtusely at an angle (α) larger than 90 degrees with respect to a rear end edge 5b. In the illustrated battery pack, the angle of the slanted surface 5a with respect to the rear end edge 5b is set at about 110 degrees. The protrusion corner 5A can have an enhanced anti-shock strength when the protrusion corner 5A is formed obtusely rather than at a right angle.

Further, the battery pack shown in FIG. 8 and FIG. 9 has a shoulder 5B at a second end, which is the end opposite to the first end having the slanted surface 5a, namely at a lower end of the mounting protrusion 5 as viewed in the drawings. As shown in FIG. 2, the shoulder 5B has a lateral protrusion 5C by having an elongated lateral width of the mounting protrusion 5 (namely, the width in the longitudinal direction of the battery module 3A) to be longer than a portion where the battery pack is attached to the electronic equipment 50. By provision of the lateral protrusion 5C, the second end of the mounting protrusion 5 has an opposing wall 5c in contact with a rear end surface 51a of the electronic equipment 50. With the opposing wall 5c being in contact with the rear end surface 51a of the electronic equipment 50, a shock affecting the second end of the mounting protrusion 5 is received by the electronic equipment 50.

The outer casing 1 shown in FIG. 3 and FIG. 9 has three battery modules 3A, in a parallel posture, disposed essentially on the same horizontal plane. FIG. 3 is a sectional view of the battery pack being vertically cut out and shows the state in which the three battery modules 3A are accommodated. As shown in this drawing, two battery modules 3A are disposed on the same horizontal plane, while the other battery module 3A, which is an outer battery 3X incorporated in the mounting protrusion 5 of the outer casing 1, is disposed in a slightly raised position. Therefore, as shown in FIG. 3, the outer casing 1 is so shaped as to be inclined upwardly toward the rear end side.

Further, as shown in FIG. 7, the two battery modules 3A that are mutually disposed on the same horizontal plane are disposed in a parallel relationship, with their opposite end faces being made flush. The other battery module 3A being the outer battery 3X incorporated in the mounting protrusion 5 is disposed so that its end is located in the lateral protrusion 5C and is accommodated out of alignment in the longitudinal direction with respect to the other two battery modules 3A. Further, the battery module 3A being the outer battery 3X accommodated in the mounting protrusion 5 is accommodated in the inner casing 2 and then in the bottom casing 1B.

The bottom casing 1B has its peripheral wall 12 formed integrally along the peripheral edge. Further, a bottom surface of the bottom casing 1B is so shaped as to incline the mounting protrusion 5 upwardly toward the rear end. The bottom casing 1B also has the connection hook 19 for connecting the battery pack to the electronic equipment 50. When the connection hook 19 is connected to the bottom casing 1B movably in a lateral direction and is attached to the electronic equipment 50, the connection hook 19 engages an engagement portion (not shown) provided at the mountable portion of the electronic equipment 50 to ensure that the battery pack is connected without being out of place.

The top casing 1A has its peripheral wall 11 formed integrally along the periphery, the peripheral wall 11 being higher than the bottom casing 1B. The peripheral wall 11 of the top casing 1A and the peripheral wall 12 of the bottom casing 1B are interconnected to form the battery storage portion 4, which is an enclosed space, inside the outer casing 1. The bottom casing 1B seals a bottom surface of the outer casing 1 and the top casing 1A seals a top surface of the outer casing 1, and thus the periphery is sealed by the peripheral walls 11, 12. The top casing 1A as well has a top surface of the mounting protrusion 5 at the rear end formed in a shape of being inclined upwardly toward the rear end. When the bottom casing 1B and the top casing 1A are interconnected, the mounting protrusion 5 of the outer casing 1 is inclined upwardly toward the rear end. Further, as shown in FIG. 4, the peripheral wall 11 of the top casing 1A has an integrally-formed inner wall 13, and the inner wall 13 projects along an inner surface of the peripheral wall 12 of the bottom casing 1B. The inner wall 13 is disposed on an inner surface of the bottom casing 1B to interconnect the respective peripheral walls 11, 12 of the top casing 1A and bottom casing 1B.

Figure 10:
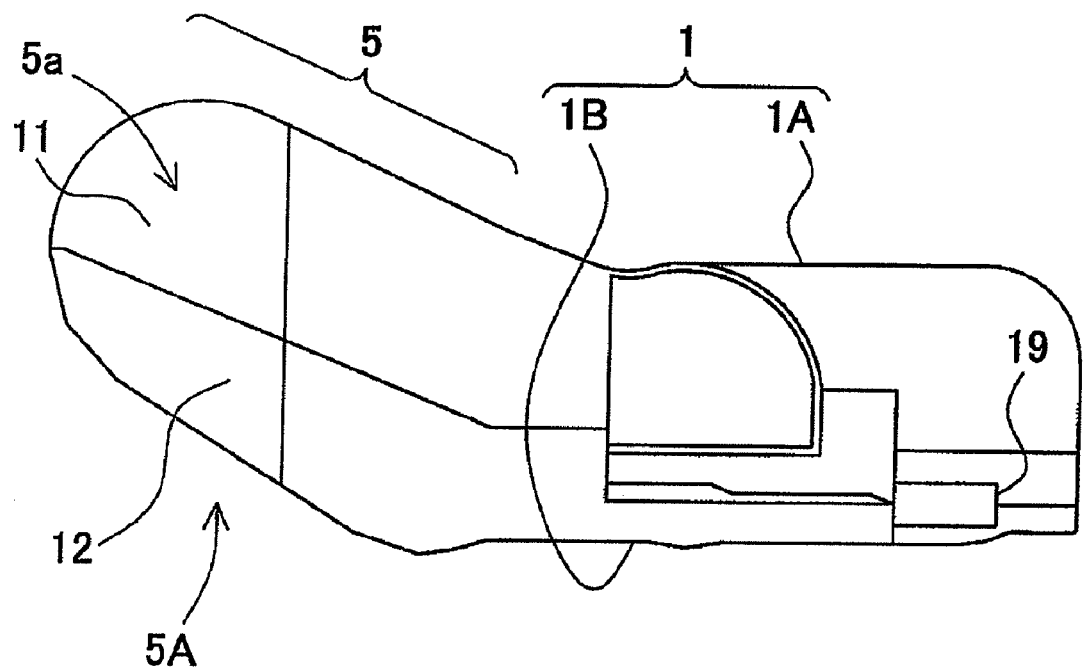
FIG. 10 is a right side view of the battery pack shown in FIG. 2.

Further, as shown in the side view in FIG. 10, the slanted surface 5a of the outer casing 1 which is provided at the first end is composed of the respective peripheral walls 12, 11 of the bottom casing 1B and the top casing 1A. As illustrated in this drawing, the slanted surface 5a of the outer casing 1 is composed of the peripheral wall 12 of the bottom casing 1B and the peripheral wall 11 of the top casing 1A. Further, as shown in the partially enlarged view in FIG. 4, the top casing 1A has the inner wall 13 formed integrally, and a mutual connection is established when the inner wall 13 is inserted inside the peripheral wall 12 of the bottom casing 1B.

Figure 11:
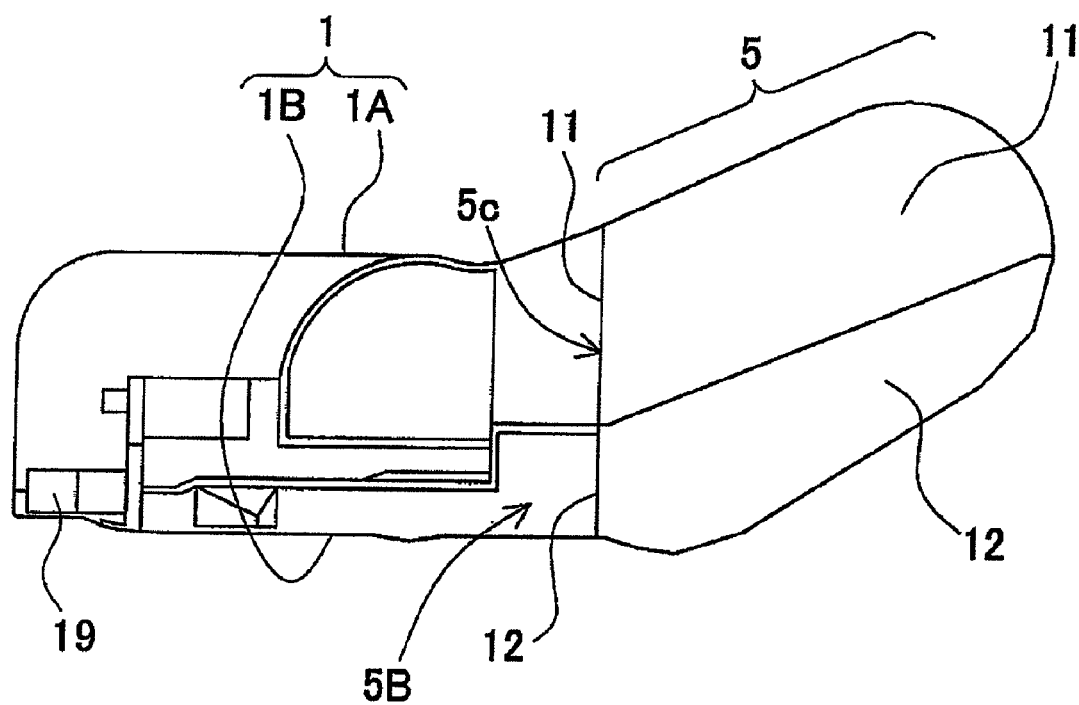
FIG. 11 is a left side view of the battery pack shown in FIG. 2.

As shown in the side view in FIG. 11, the peripheral walls 11, 12 constituting the opposing wall 5c located at the lateral protrusion 5C of the outer casing 1 is also divided into lower and upper portions by the bottom casing 1B and the top casing 1A. These peripheral walls 11, 12 as well are interconnected when the inner wall 13, which is formed integrally with the top casing 1A, is inserted into the inner surface of the peripheral wall 12 of the bottom casing 1B.

(Inner Casing)

The inner casing 2, accommodating the outer battery 3X inside, is disposed inside the mounting protrusion 5 of the outer casing 1. Therefore, the inner casing is formed in a shape that conforms to the inner surface of the mounting protrusion 5 composed of the bottom casing 1B and the top casing 1A, and the outer battery 3X disposed outside the electronic equipment 50 is accommodated inside the inner casing 2. Further, the inner casing 2 has the anti-shock rib 6 formed integrally at the end, thus improving the anti-shock strength at the end.

Figure 12:
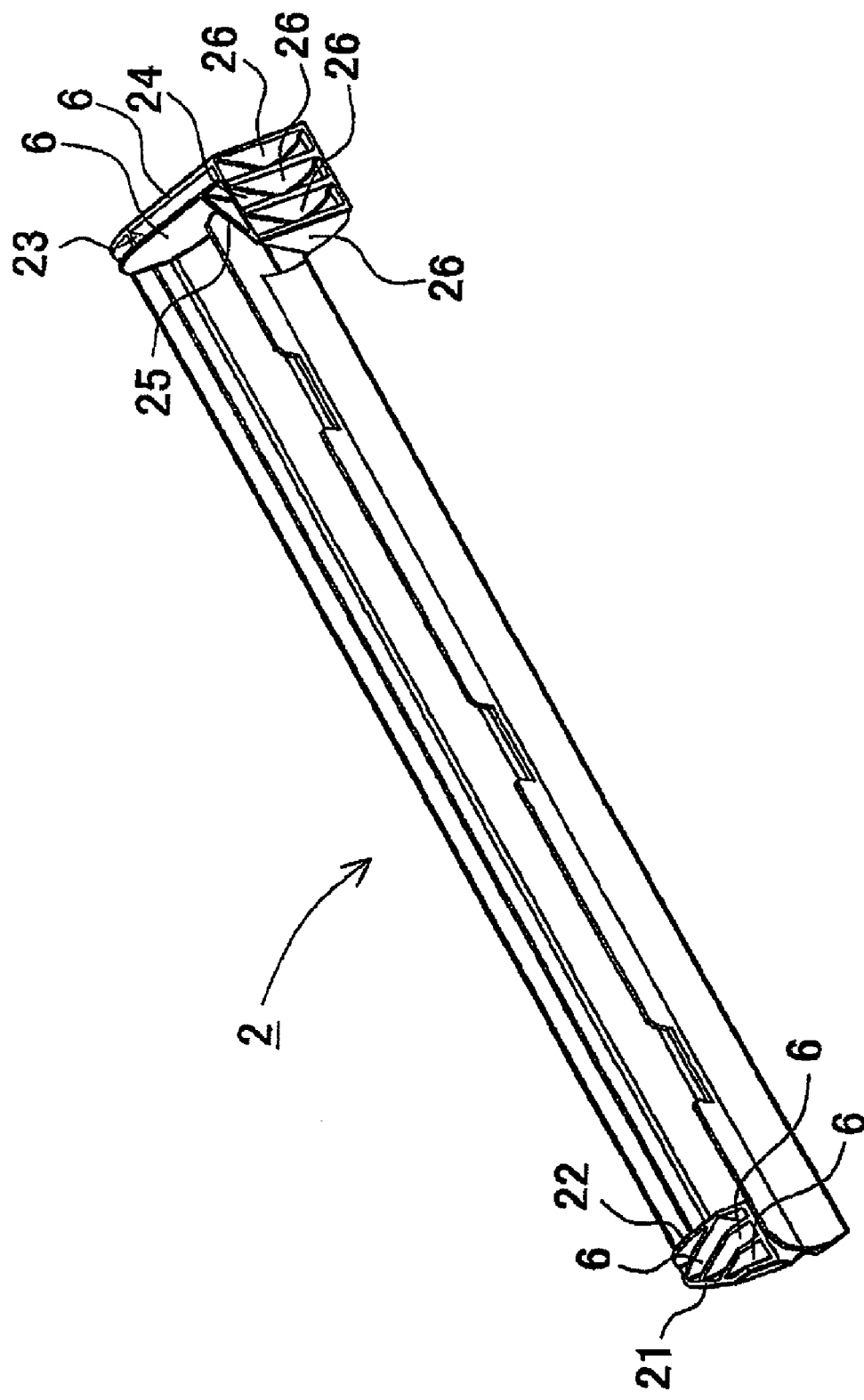
FIG. 12 is a rear perspective view illustrating the inner casing of the battery pack shown in FIG. 6.

Respectively shown in FIG. 12 and FIG. 13 are the inner casings 2. Each of these inner casings 2 has the respective anti-shock rib 6 both at a first end located on the left side and at a second side located on the right side, as viewed in the drawings.

Provided at the first end are a plurality of rows of the anti-shock ribs 6. As shown in FIG. 5, FIG. 6 and FIG. 8, the inner casing 2 has, at its first end, an integrally formed side wall 21 disposed inside the slanted surface 5a of the outer casing 1, and the plurality of rows of the anti-shock ribs 6 extend from the side wall 21 toward the inside. In the case of the anti-shock rib 6 shown in the top plan view in FIG. 8 and FIG. 13, three rows of anti-shock ribs 6 are provided in a posture angled at about 30 degrees with respect to the terminal electrode of the outer battery 3X. Further, the illustrated inner casing 2 also has a separation wall 22 integrally formed so as to match with the terminal electrode of the outer battery 3X. The anti-shock rib 6, which is positioned closest to the separation wall 22, is disposed between the separation wall 22 and the side wall 21 and is integrally formed with the inner casing 2 so as to be connected to the separation wall 22 and the side wall 21. The inner casing 2, which is disposed inside the outer casing 1, has the anti-shock rib 6 connected via the side wall 21 to the slanted surface 5a of the outer casing 1. As indicated by arrow in FIG. 8 and FIG. 9, the inner case is so designed that the side wall 21 receives the shock applied to the slanted surface 5a of the protrusion corner 5A and the shock received by the side wall 21 is further received by the plurality of anti-shock ribs 6, thus improving the anti-shock strength. Here, to express from a different viewpoint, the separation wall 22 and the side wall 21 also serve as the anti-shock rib.

Provided at the second end of the inner casing 2 as shown in FIG. 7, FIG. 12 and FIG. 13 are a plurality of rows (two rows as viewed in the drawings) of anti-shock ribs 6 in parallel with the end face of the outer battery 3X, and the anti-shock ribs 6 are spaced apart at a prescribed interval. The two rows of anti-shock ribs 6 are made thicker on the outside and thinner on the inside opposite to the terminal electrode of the outer battery 3X. The anti-shock rib 6 is made thicker on the outside to enhance the anti-shock strength and is made thinner on the inside opposite to the terminal electrode of the outer battery 3X to enlarge the effect of absorbing the shock occurring from a collision to the terminal electrode. Further, a connection rib 23 is integrally formed between the outside and inside anti-shock ribs 6 to improve the anti-shock strength of the two rows of the anti-shock ribs 6. The anti-shock rib 6 on the outside is formed inside the peripheral walls 11, 12 of the outer casing 1, but to be more precise, in a shape of so as to be positioned closer to the inside of the inner wall 13 extending from the peripheral wall 11 of the top casing 1A.

Further, the inner casing 2 shown in FIG. 7 through FIG. 9, FIG. 12 and FIG. 13 has a planar rib 24 integrally formed at the second end so as to oppose the inner side of the opposing wall 5c of the peripheral walls 11, 12 provided at the lateral protrusion 5C of the outer casing 1, and the plurality of rows of the anti-shock ribs 6 are connected to the planar rib 24. Also integrally formed at a corner between the planar rib 24 and the inside anti-shock rib 6 is a slanted rib 25 to connect the planar rib 24 and the inside anti-shock rib 6 together in a triangular form. Integrally formed at the planar rib 24 is a plurality of rows of the connection ribs 26 projecting toward the inner surface of the opposing wall 5c. The distance between the planar rib 24 and the opposing wall 5c becomes larger from the upper portion toward the lower portion, so that a width of the connection rib 26 is made larger from the upper portion toward the lower portion. That is, the connection rib 26 is formed with a width approaching the inner surface of the opposing wall 5c. The inner casing 2 is disposed inside the outer casing 1, with the anti-shock rib 6 being connected to the opposing wall 5c of the outer casing 1 via the planar rib 24, the slanted rib 25 and the connection rib 26. The connection rib 26 is located between the planar rib 24 and the opposing wall 5c, and, as indicated by arrows in FIG. 8 and FIG. 9, the shock acting from outside on the lateral protrusion 5C of the outer casing 1 and then acting on the anti-shock rib 6 is propagated from the planar rib 24 to the opposing wall 5c of the outer casing 1, and thus the anti-shock strength of the second end is improved. This structure improves the anti-shock strength in such portion, because the shock on the second end of the mounting protrusion 5 is propagated from the peripheral wall 11 of the outer casing 1 to the two rows of anti-shock ribs 6, from the anti-shock ribs 6 to the planar rib 24, from the planar rib 24 to the plurality of rows of the connection ribs 26, from the connection ribs 26 to the opposing wall 5c, and from the opposing wall 5c to the electronic equipment casing 51. That is to say, when the shock acting on the second end is received by the plurality of rows of the anti-shock ribs 6, the shock on the anti-shock ribs 6 is received by the planar rib 24, the shock on the planar rib 24 is received by the connection ribs 26, the shock on the connection ribs 26 is received by the peripheral wall 11, the shock on the opposing wall 5c is received by the electronic equipment casing 51, and when such dispersed shock is further received by the sturdy electronic equipment casing 51, the anti-shock strength is improved for effective protection of the outer battery 3X. Here, to express from a different viewpoint, the planar rib 24, the slanted rib 25 and the connection ribs 26 also serve as anti-shock ribs.

A vertical width of the anti-shock ribs 6 provided at the opposite ends of the inner casing 2 is set to be a width of approaching the inner surfaces adjacent to the bottom surface of the bottom casing 1B and the top surface of the top casing 1A, that is, the vertical width is set to be equal to a vertical width of the inner side of the outer casing 1. As shown in FIG. 4, the inner casing 2 connects the top and bottom ends of the anti-shock rib 6 in abutment with the inner surface of the outer casing 1. Such structure allows the shock acting on the bottom casing 1B to be received by the bottom casing 1B and by the top casing 1A via the anti-shock rib 6 of the inner casing 2, or allows the shock actin on the top casing 1A to be received by the top casing 1A and by the bottom casing 1B via the anti-shock rib 6 of the inner casing 2. Therefore, damage to the mounting protrusion 5 of the outer casing 1 can be effectively inhibited by the bottom casing 1B, the top casing 1A, and the anti-shock rib 6 of the inner casing 2.

A detailed description shall further be made below regarding an outer casing and an inner casing of a battery pack in accordance with the second embodiment.

(Outer Casing)

Figure 16:
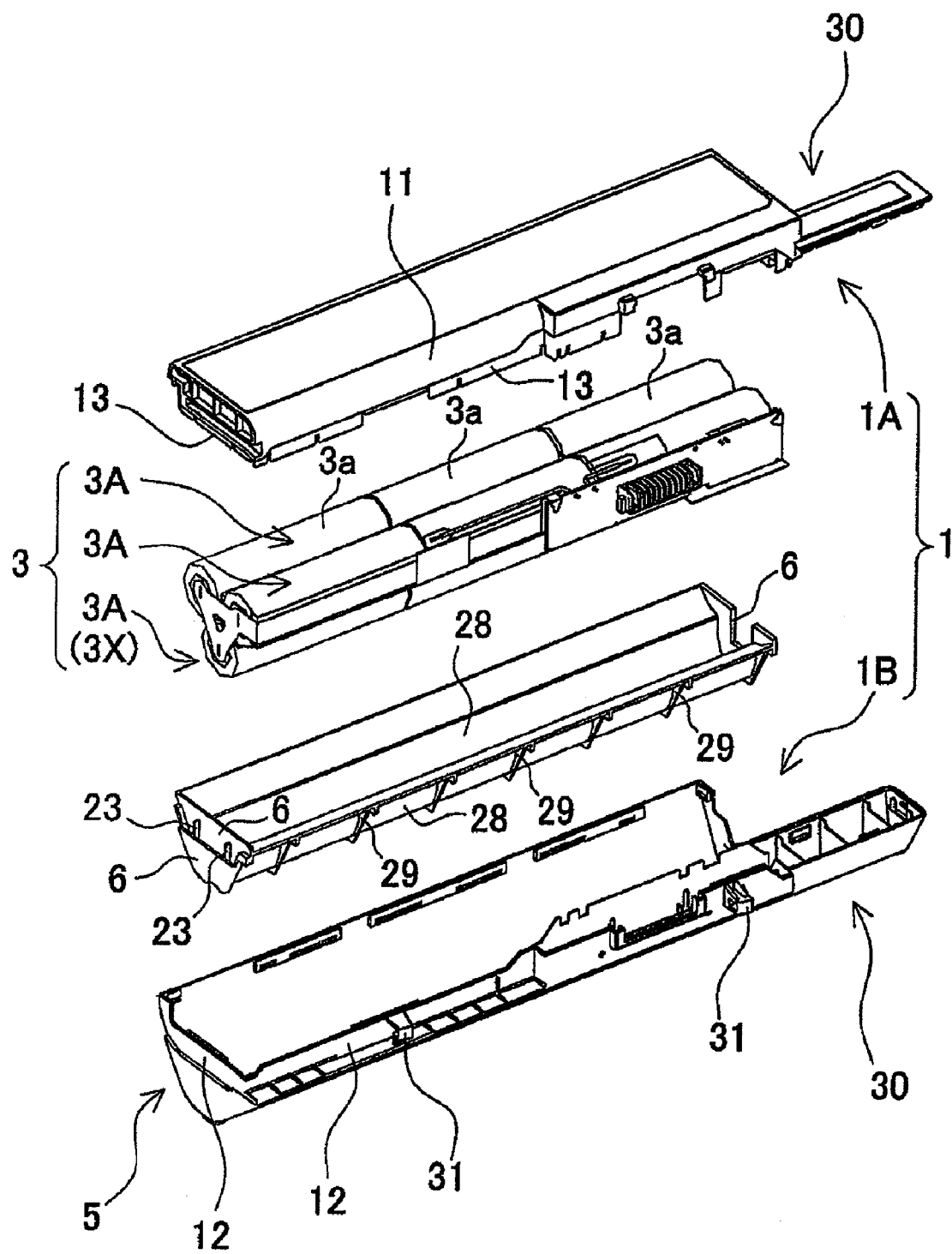
FIG. 16 is an exploded perspective view of the battery pack shown in FIG. 14.
Figure 17:
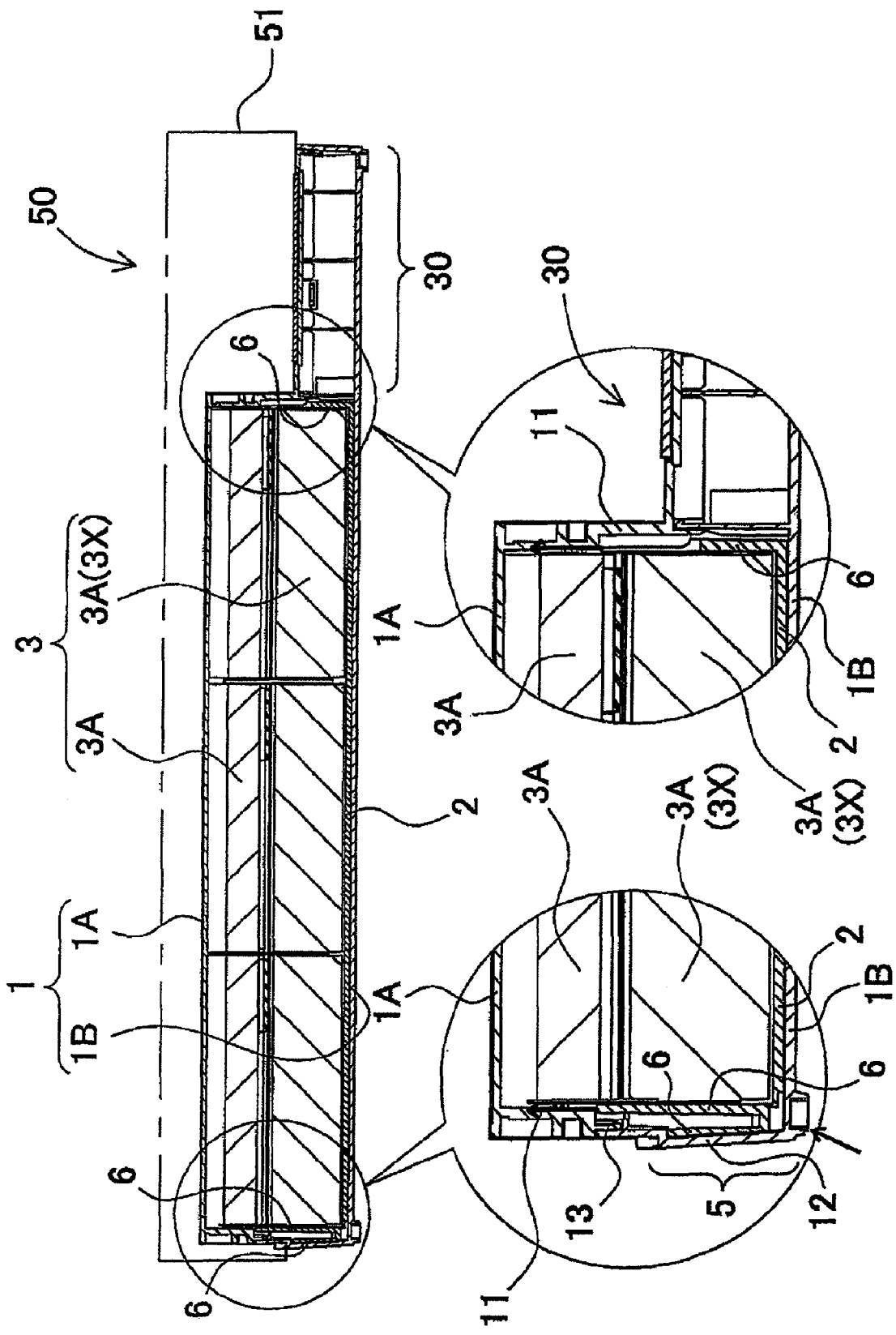
FIG. 17 is a partially enlarged, vertical, longitudinal, sectional view of the battery pack shown in FIG. 14.

The outer casing 1 shown in FIG. 14, FIG. 16 and FIG. 17 has its planar shape in an elongated rectangle and has a protrusion leg 30 at one end. The outer casing 1 is composed of a bottom casing 1B on the lower side and a top casing 1A on the upper side, and has a positioning protrusion 31 for establishing a connection at a prescribed position of the electronic equipment 50. The electronic equipment 50 has a connection hook (not shown) to be connected with the positioning protrusion 31 and is disposed in place by connecting the connection hook to the positioning protrusion 31 of the battery pack mounted at a prescribed position. Further, the illustrated outer casing 1 has a connector 8 disposed between the positioning protrusions 31. The battery pack shown in these drawings is attached to the electronic equipment 50 such as a personal computer as shown in the vertical sectional view in FIG. 15 and has, at the lower portion, a mounting protrusion 5 projecting outwardly from the electronic equipment 50. The mounting protrusion at the lower portion is shaped with its vertical cross section being of an inverted triangle, inside which is accommodated the outer battery 3X.

In the outer casing 1 shown in FIG. 15 and FIG. 16, three battery modules 3A in a parallel posture are disposed so as to be respectively positioned at an apex of an inverted triangle. FIG. 15 is a sectional view of the vertically cut-out battery pack, showing the state where the three battery modules 3A are accommodated. The two pieces of battery modules 3A are placed inside the electronic equipment casing 51 and disposed on the same horizontal plane, while the other battery module 3A being an outer battery 3X is disposed on the lower tier and accommodated in the mounting protrusion 5. The outer battery 3X, being placed between the two battery modules 3A disposed on the upper tier, is placed below the battery modules 3A disposed on the upper tier. Therefore, the outer battery 3X is accommodated in the mounting protrusion 5 of the outer casing 1 being shaped in the inverted triangle. The three battery modules 3A have their terminal electrodes connected at opposite ends by spot-welding a lead 9, and are interconnected in parallel by means of the lead. Further, the battery module 3A being the outer battery 3X accommodated in the mounting protrusion 5 is accommodated in the inner casing 2 and then in the bottom casing 1B.

As shown in FIG. 15 through FIG. 17, the bottom casing 1B is in a form of connecting the protrusion leg 30 to the planar shape being in an elongated rectangular, and has a peripheral wall 12 integrally formed along the peripheral edge (of the protrusion leg 30). In the bottom casing 1B, the bottom surface is formed in continuation to a surface constituting two sides of the triangle, and the mounting protrusion 5 is provided inside with its cross section being in the shape of an inverted triangle. The protrusion leg 30 is formed in a shape of longitudinally extending the mounting protrusion 5 projecting at the bottom surface from the electronic equipment casing 51. The protrusion leg 30 is flush with the mounting protrusion 5 and is used as a leg portion of the electronic equipment 50 to which the battery pack is attached.

The top casing 1A has the peripheral wall 11 integrally formed at the periphery. The peripheral wall 11 of the top casing 1A and the peripheral wall 12 of the bottom casing 1B are interconnected to form a closed inner space constituting the battery storage portion 4. The bottom casing 1B seals the bottom surface of the outer casing 1, the top casing 1A seals the top surface of the outer casing 1, and the periphery is sealed by the peripheral walls 11, 12. The top casing 1A shown in FIG. 15 and FIG. 16, being connected to the peripheral wall 11, has an inner wall 13 integrally formed, and the inner wall 13 projects along the inner surface of the peripheral wall 12 of the bottom casing 1B. The inner wall 13 is disposed on the inner surface of the peripheral wall 12 of the bottom casing 1B, interconnecting the peripheral walls 11, 12 of the top casing 1A and bottom casing 1B.

(Inner Casing)

The inner casing 2, which is inside the bottom casing 1B of the mounting protrusion 5, accommodates the outer battery 3X. The inner casing 2 has a semi-tubular portion 28 with its upper side being open so as to be able to accommodate the battery modules 3A with cylindrical batteries that are linearly interconnected in series inside and has a support rib 29 integrally formed at prescribed intervals outside the semi-tubular portion 28. The support rib 29 is formed in a shape of following along the inner surface of the bottom casing 1B, the inner surface constituting two sides of the inverted triangle, and the semi-tubular portion 28 is placed in the mounting protrusion 5 of the bottom casing 1B by means of a plurality of support ribs 29. The support rib 29 as well serves as the anti-shock rib.

Figure 18:
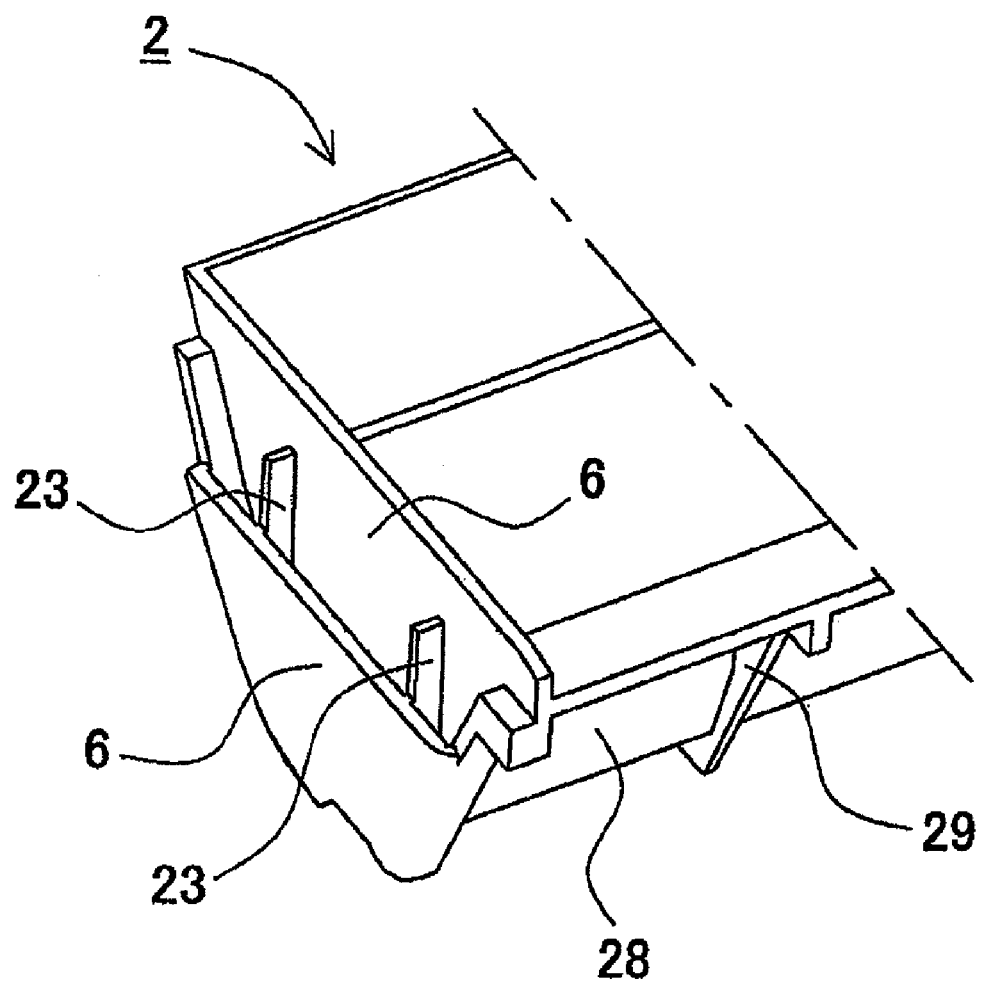
FIG. 18 is an enlarged, sectional view illustrating the major portion of the inner casing shown in FIG. 16.

Further, the inner casing 2 has a single anti-shock rib 6 formed integrally at a first end having the protrusion leg 30 and also has two rows of anti-shock ribs 6 formed integrally at a second end opposite to the first end, namely at the left-side end as viewed in FIG. 16, thus improving the anti-shock strength at the ends. As shown in FIG. 17 and FIG. 18, the inner casing 2 has two rows of anti-shock ribs 6, spaced apart at a prescribed distance, at the second end. The two rows of anti-shock ribs 6 are made lower at the outside and higher at the inside opposite to the terminal electrode of the outer battery 3X, and has a connection rib 23 formed integrally between the outside and inside anti-shock ribs 6, thus improving the anti-shock strength of the two rows of anti-shock ribs 6. In the inner casing 2, when a plate such as a metallic plate for improving shock absorbability is interposed in a gap defined between the outside and inside anti-shock ribs 6, the anti-shock strength can be improved to a further extent.

The anti-shock rib 6 provided respectively at the opposite ends of the inner casing 2 connects an upper end edge of the rib in abutment with the peripheral wall 11 of the top casing 1A as shown in a partially enlarged view in FIG. 17. That is, the anti-shock strength at the opposite ends of the mounting protrusion 5 is improved because the shock acting on the anti-shock rib 6 is propagated/transmitted to the peripheral wall 11 of the top casing 1A as indicated by arrow in the drawing. Since such structure enables the shock acting on the bottom casing 1B to be received by the bottom casing 1B and by the top casing 1A via the anti-shock rib 6 of the inner casing 2, damage to the mounting protrusion 5 of the outer casing 1 can be effectively inhibited by the bottom casing 1B, the anti-shock ribs 6 of the inner casing 2, and the top casing 1A.

It should be apparent to those of ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the scope of the invention as defined in the appended claims. The present application is based on Application No. 2008-64859 filed in Japan on Mar. 13, 2008, the content of which is incorporated herein by reference.

What is claimed is:
1. A battery pack to be connected to electronic equipment, the battery pack comprising:
 a plastic-made, elongated outer casing having peripheral walls interconnected to define a battery storage portion, the outer casing comprising a mounting protrusion to be attached to a casing of the electronic equipment and project therefrom in the attached state;

an inner casing incorporated inside the battery storage portion of the outer casing at the mounting protrusion; and at least one battery accommodated in the battery storage portion inside the outer casing, wherein the mounting protrusion is a double structure comprised of the outer casing and the inner casing, and the battery is accommodated inside the double structure, and the battery accommodated inside the double structure is located outside the electronic equipment when the mounting protrusion is in the attached state, wherein the inner casing has an anti-shock rib formed integrally at an end of the inner casing, wherein the inner casing has an integrally formed side wall disposed inside the outer casing, and the anti-shock rib is connected to the side wall, and wherein the inner casing has a plurality of the anti-shock ribs, and the outermost one of the anti-shock ribs is made thicker relative to an innermost one of the anti-shock ribs which is closest to the battery.

2. The battery pack as recited in claim 1, wherein the inner casing has anti-shock ribs formed integrally at opposite ends of the inner casing.

3. The battery pack as recited in claim 1, wherein at least one of the anti-shock ribs of the inner casing is connected to the outer casing.

4. The battery pack as recited in claim 1, wherein the inner casing has an integrally formed separation wall that opposes a terminal electrode of the battery, and at least one of the anti-shock ribs is disposed between the separation wall and the side wall.

5. The battery pack as recited in claim 1, wherein the outer casing has a slanted surface at a corner of the mounting protrusion, the side wall of the inner casing being located interiorly of the slanted surface, and the plurality of anti-shock ribs are formed integrally with the inner casing so as to extend inwardly from the side wall.

6. The battery pack as recited in claim 1, wherein a connection rib is formed integrally between two of the anti-shock ribs.

7. The battery pack as recited in claim 1, wherein the plurality of anti-shock ribs are disposed near an end face of the battery.

8. The battery pack as recited in claim 7, wherein the inner casing further has a planar rib and a plurality of connection ribs at a portion where the plurality of anti-shock ribs are connected with the outer casing, the planar rib being connected in a direction orthogonal to the anti-shock ribs and the plurality of connection ribs being disposed with respect to the outer casing in a connection orthogonal to the planar rib; and the planar rib and the connection ribs are formed integrally with the inner casing.

9. The battery pack as recited in claim 7, wherein the inner casing has, inside the mounting protrusion, the plurality of anti-shock ribs near the battery, and further has the plurality of anti-shock ribs connected to the outer casing.

10. The battery pack as recited in claim 7, wherein the outer casing has a lateral protrusion, and the plurality of anti-shock ribs are provided at an end of the lateral protrusion.

11. The battery pack as recited in claim 10, wherein the inner casing has an integrally formed planar rib that opposes an inner side of the peripheral walls at the lateral protrusion of the outer casing, and the plurality of anti-shock ribs are connected to the planar rib.

12. The battery pack as recited in claim 11, wherein a slanted rib is integrally formed at a corner between the planar rib and one of the anti-shock ribs to connect the planar rib and the one anti-shock rib together in a triangular form.

13. The battery pack as recited in claim 1, wherein the battery is a cylindrical battery.

14. The battery pack as recited in claim 1, wherein the battery is a lithium-ion battery.

15. The battery pack as recited in claim 1, wherein the battery has a plurality of cells linearly interconnected in series to make up a battery module.

16. The battery pack as recited in claim 1, wherein the inner casing is interposed between a bottom surface of the outer casing and the battery.

17. A battery pack to be connected to electronic equipment, the battery pack comprising:

a plastic-made, elongated outer casing having peripheral walls interconnected to define a battery storage portion, the outer casing comprising a mounting protrusion to be attached to a casing of the electronic equipment and project therefrom in the attached state;

an inner casing incorporated inside the battery storage portion of the outer casing at the mounting protrusion; and a battery comprising a plurality of battery modules accommodated in the battery storage portion inside the outer casing, the battery modules being disposed in a parallel arrangement, wherein the mounting protrusion is a double structure comprised of the outer casing and the inner casing, and an outermost one of the battery modules is accommodated inside the double structure, and the outermost battery module, which is accommodated inside the double structure, is located outside the electronic equipment when the mounting protrusion is in the attached state, wherein the inner casing has an anti-shock rib formed integrally at an end of the inner casing, wherein the inner casing has an integrally formed side wall disposed inside the outer casing, and the anti-shock rib is connected to the side wall, and wherein the inner casing has a plurality of the anti-shock ribs, and the outermost one of the anti-shock ribs is made thicker relative to an innermost one of the anti-shock ribs which is closest to the battery.

* * * * *